June 18, 1963 R. TORRESEN ET AL 3,094,326
PIN DETECTING AND INDICATING APPARATUS
Filed Aug. 23, 1961 5 Sheets-Sheet 2
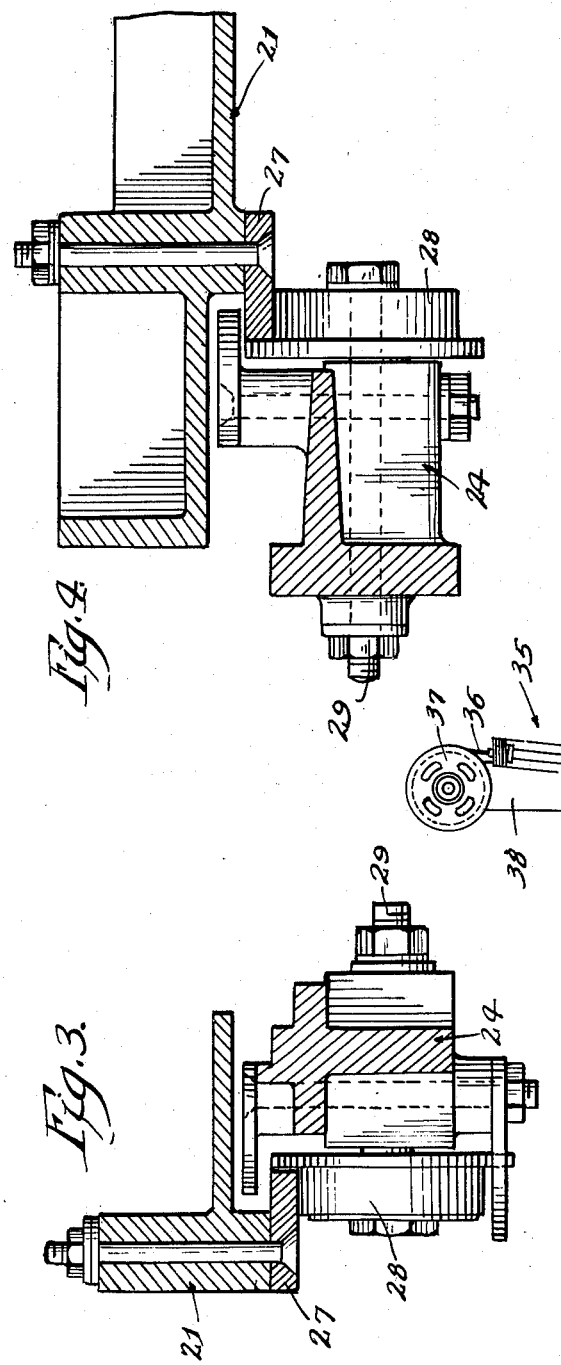
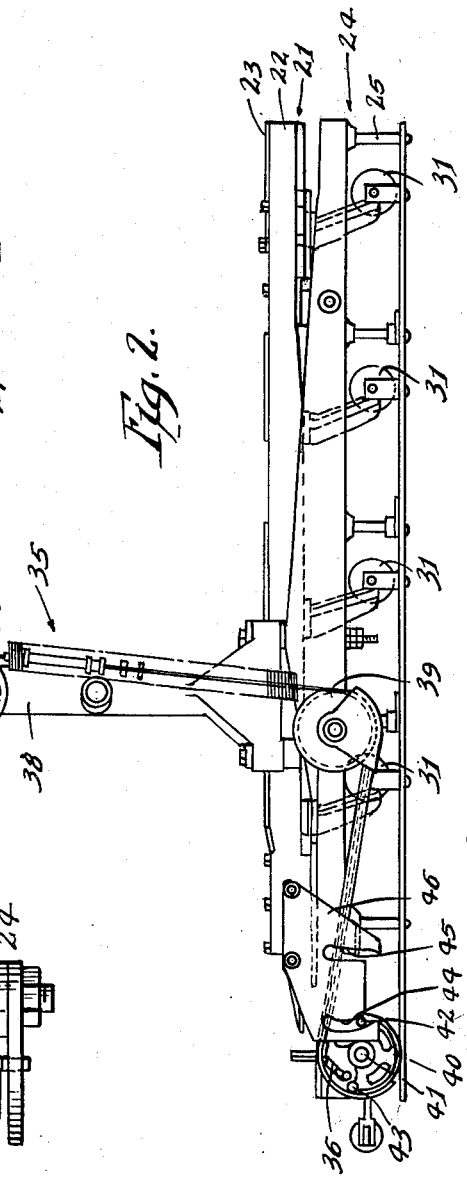

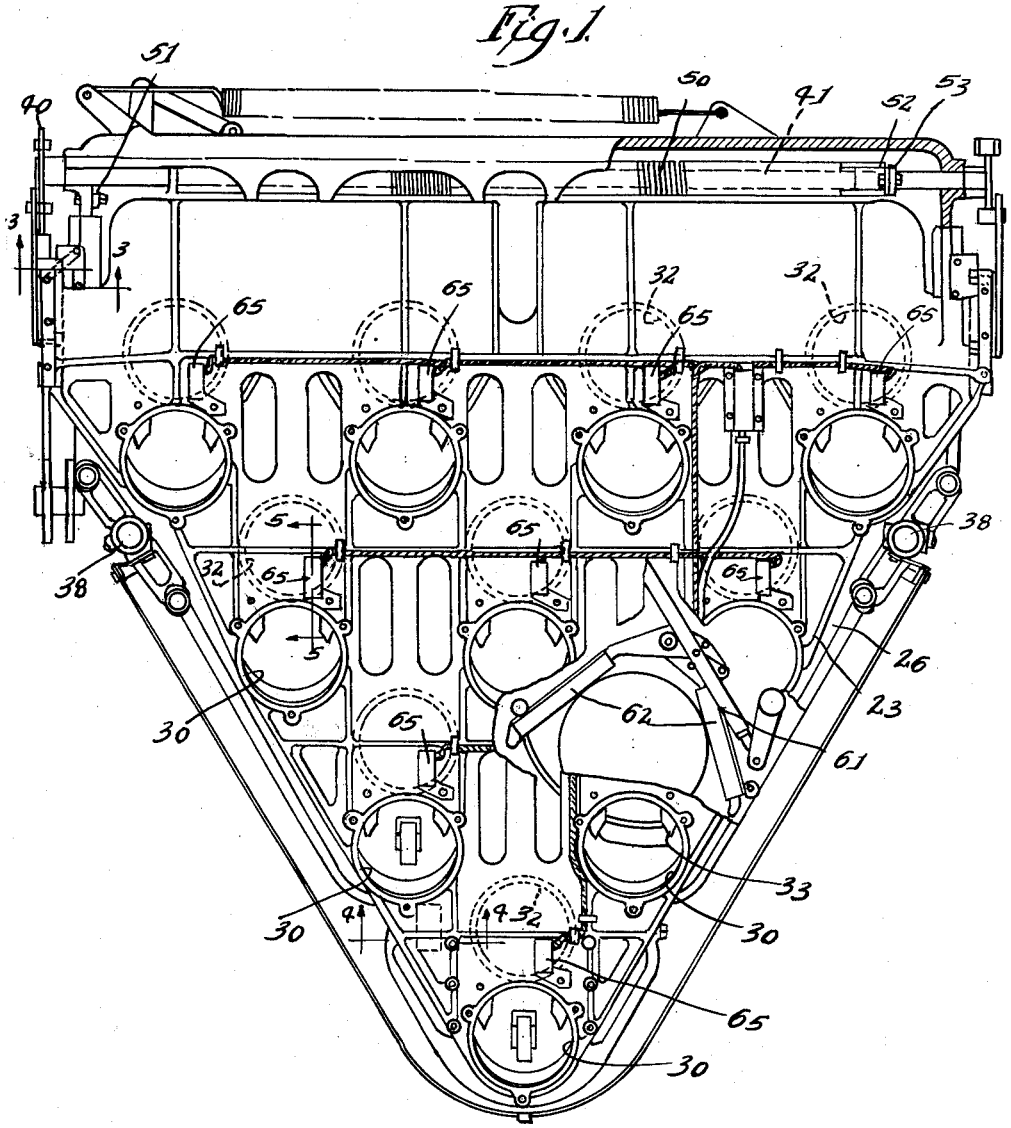

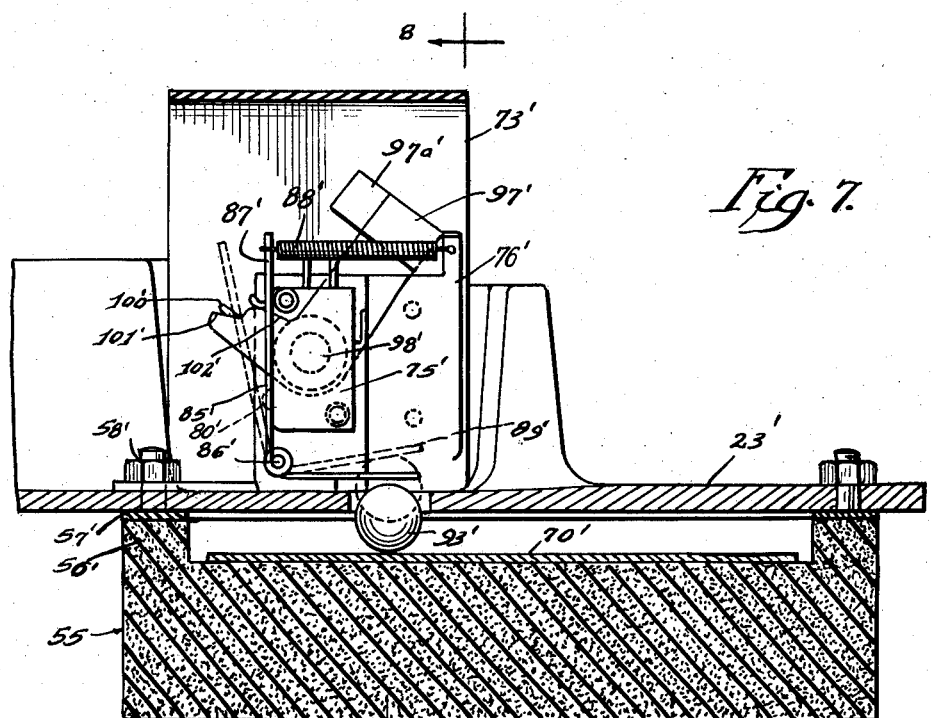
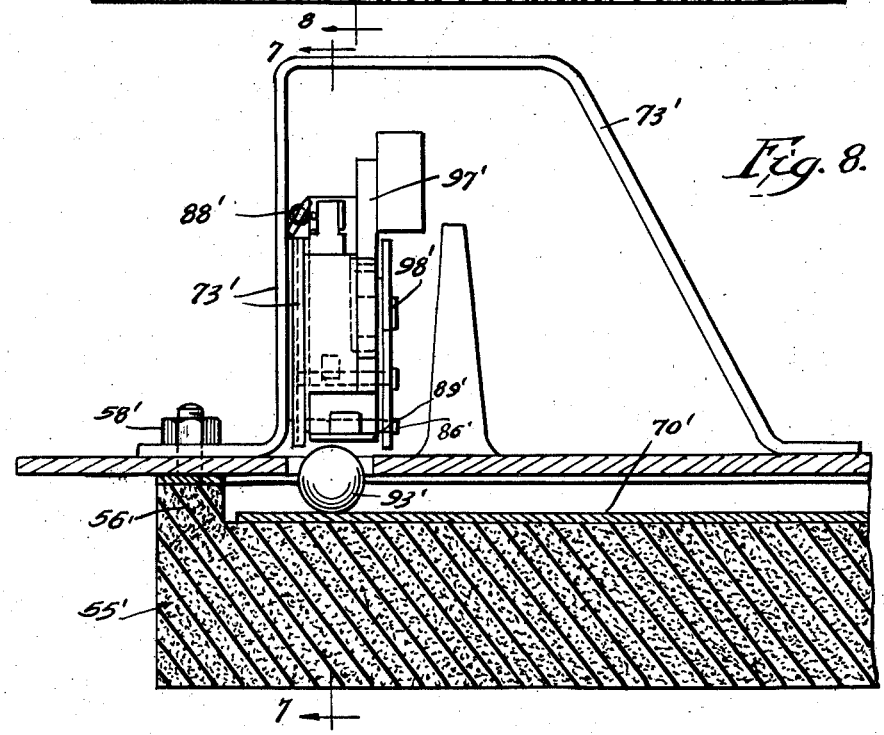

United States Patent Office 3,094,326
Patented June 18, 1963

3,094,326
PIN DETECTING AND INDICATING APPARATUS
Robert Torresen, Muskegon, and Milton E. Brown, Grand Haven, Mich., assignors, by mesne assignments, to Brunswick Corporation, Chicago, Ill., a corporation of Delaware
Filed Aug. 23, 1961, Ser. No. 133,479
23 Claims. (Cl. 273—42)

This invention relates to apparatus for detecting standing pins on a bowling alley, and more particularly to such apparatus installed on automatic pinsetters to operate indicators.

It is the primary object of this invention to provide a new and improved pin detecting apparatus for bowling alley installations.

When standing at the foul line of a bowling alley it is often difficult to see which pins are still standing after rolling a ball. For example, it is often difficult to see a pin standing directly behind another pin, or to determine the precise position of a pin longitudinally of the alley. Various indicating systems have been developed for indicating to a player standing at the foul line precisely which pins are still standing on the alley. Such indicating systems usually are of an electrical nature and they have detecting portions mounted on an automatic pinsetter overlying the bowling alley. The pin detecting apparatus is often of an involved mechanical nature such that it is both expensive and complicated to install and maintain on the pinsetter. The electrical components between the detecting portions and indicators, which are usually electrical lights, also have previously been of a rather involved and expensive type.

Another object of this invention is to provide new and improved pin detecting apparatus for indicating bowling pins standing on a bowling alley during play of a game.

An important object of this invention is to provide a new and improved pin detecting apparatus installed on a bowling alley and having electrical switch assemblies operable by movement of part of the apparatus longitudinally of the bowling alley.

A more specific object of the invention is to provide a new and improved bowling pin detecting apparatus including a pinsetter deck assembly mounted for movement toward and away from a bowling alley and having an upper deck mounted on a lower deck for movement longitudinally of the alley with means on the upper deck for engaging the head of a pin standing on the alley when the deck assembly is lowered, a switch mounted on the upper deck and positioned responsive to the first means engaging a standing pin for operating an indicator, and inertia latch means for retaining the switch positioned to maintain the indicator operative, and for operating the switch to turn off the indicator responsive to operation of the upper deck longitudinally of the alley and across the lower deck.

Other objects and advantages will become readily apparent from the following detailed description taken in conjunction with the accompanying drawings, in which:

FIGURE 1 is a plan view of a pinsetter deck structure including pin detecting apparatus embodying principles of the invention, with parts broken away and removed to more clearly illustrate the construction;

FIGURE 2 is a side elevational view of the pinsetter deck structure of FIGURE 1, with parts removed to more clearly illustrate the construction;

FIGURE 3 is an enlarged, fragmentary vertical section taken generally along the line 3—3 of FIGURE 1;

FIGURE 4 is an enlarged, fragmentary vertical section taken generally along the line 4—4 of FIGURE 1;

FIGURE 7 is a fragmentary vertical section, similar to FIGURE 5, of another embodiment of a switch assembly;

FIGURE 8 is a fragmentary vertical section taken generally along the line 8—8 of FIGURE 7;

Figure 5:
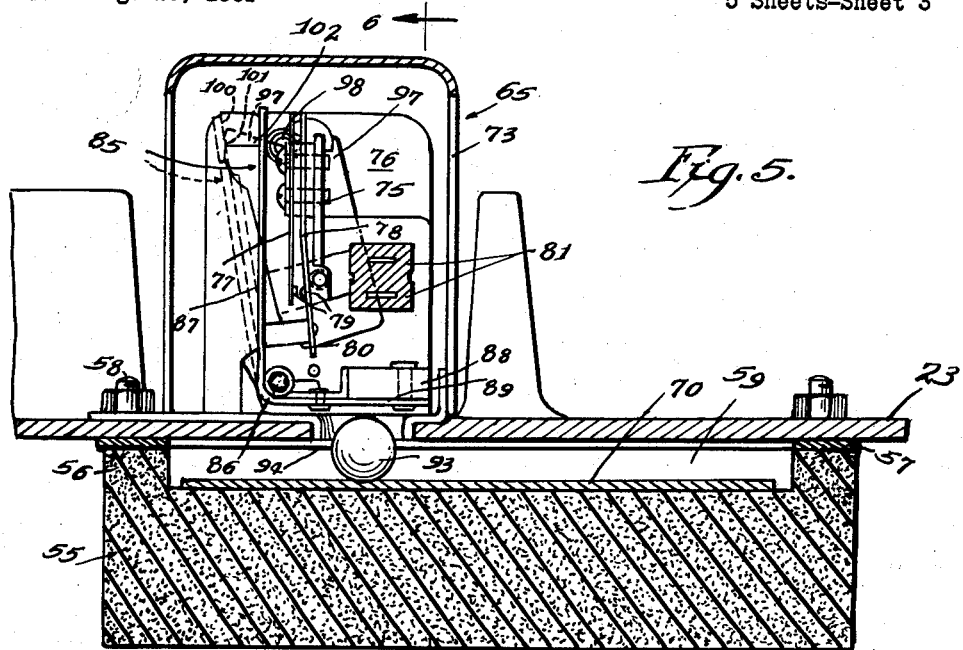
FIGURE 5 is an enlarged, fragmentary vertical section of a switch assembly of the pin detecting apparatus taken generally along the line 5—5 of FIGURES 1 and 6.

While illustrative embodiments of the invention are shown in the drawings it will be described in detail herein, the invention is susceptible of embodiment in many different forms, and it should be understood that the present disclosure is to be considered as an exemplification of the principles of the invention and is not intended to limit the invention to the embodiments illustrated. The scope of the invention will be pointed out in the appended claims.

The invention is, in brief, directed to a pin detecting apparatus movable longitudinally of a bowling alley and having switch assemblies, one for each of ten bowling pins. Each switch assembly is operated for actuating an indicator in response to actuation of related means for detecting a standing pin on the bowling alley. In the illustrated embodiments the pin detecting apparatus is mounted on an upper deck of a deck assembly in an automatic pinsetter. The deck assembly is mounted for movement toward and away from the bowling alley, and includes a lower deck which mounts the upper deck for movement longitudinally of the alley. In the illustrated embodiments, as the deck assembly moves toward the bowling alley, upon detection of a pin standing on the alley a related switch assembly is operated from a normal position to a set position for actuating an indicator corresponding to the detected pin. Inertia latch means are provided for operating the switch assembly from set to normal position in response to movement of the upper deck longitudinally of the bowling alley. Movement and construction of the pinsetter may be of a substantially conventional nature and the pin detecting apparatus is constructed to cooperate with normal operation of the pinsetter. However, the pin detecting apparatus is not limited to operation in conjunction with any particular pinsetter and may be incorporated in structures other than pinsetters, as will be obvious to one skilled in the art.

Referring to FIGURES 1–4 of the drawings, the invention is illustrated in connection with an automatic pinsetter deck structure of the general type disclosed in U.S. Patent No. 2,949,300 to Huck et al., and reference may be had thereto for additional discussion of the pinsetter construction and operation. This deck structure is substantially horizontally disposed over the end of a bowling alley (not shown) adjacent its pit for receiving pins from a suitable distributing mechanism (not shown), setting the pins on the bowling alley in preparation for bowling and, after a ball has been rolled, picking up the pins which remain standing to permit removal of dead wood and then resetting the last mentioned standing pins for continued bowling. After each frame the pinsetter resets pins on the bowling alley for play of the following frame.

Generally, the deck structure is vertically movable toward and away from the surface of the bowling alley over which it is installed in a suitable manner. The pinsetter deck structure includes an upper deck 21 having a suitable generally triangular frame 22 with a generally triangularly shaped upper deck plate 23 preferably cast integrally with the frame, and a lower deck 24 having a suitable generally triangularly shaped lower deck frame or plate 25 or skeleton form. As illustrated in FIGURES 3 and 4, upper deck 21 is supported on lower deck 24 for movement longitudinally of the bowling alley by tracks 27 on the upper deck riding in rollers 28 journaled on shafts 29 mounted on the lower deck. Upper deck plate 23 has suitable openings 30 for receiving bowling pins from the distributing mechanism above the pinsetter. Pins delivered to openings 30 are received on suitable rollers 31 mounted on lower deck 24 when upper deck 21 is moved longitudinally of the alley and forwardly on lower deck 24 to a pin detecting position. By moving upper deck 21 longitudinally of the alley and rearwardly on lower deck 24 to a pin setting position (not shown), the upper deck plate openings 30 are generally aligned with and overlie pin passing openings (not visible) in the lower deck plate 25, and pins in upper deck openings 30 move off of lower deck rollers 31 and drop through the lower deck openings. Movement of the pins through the deck openings may be assisted by suitable guides 33 on upper deck 21 at openings 30.

Mechanism for moving upper deck 21 across lower deck 24 is fully described in the aforementioned Huck patent, and will be briefly described herein in the form of a cable mechanism 35. Movement of the upper deck 21 forwardly on lower deck 24, from the pin setting position (not shown) to the pin detecting position illustrated in FIGURES 1 and 2 is accomplished by drawing a cable 36 over a pulley 37 journaled on the upper end of a support 38 which is mounted on lower deck 24. Cable 36 also passes around a pulley 39 journaled on lower deck 24, and passes around and is attached to a pulley 40 secured to the end of a shaft 41 for rotating pulley 40. Shaft 41 extends across the rear of lower deck 24 and is journaled at opposite ends on the lower deck. Secured to pulley wheel 40 are a pair of generally diametrically opposed outwardly extending cam pins 42 and 43 which are movable in cam slots 44 and 45, respectively, in a cam plate 46 secured to and depending from one side of upper deck 21, for moving the upper deck forwardly and rearwardly on lower deck 24. During movement of the upper deck to the pin detecting position shown in FIGURES 1 and 2, pulley wheel 40 is rotated clockwise as seen in FIGURE 2, winding a spiral torsion spring 50 which is telescoped on shaft 41 and has one end 51 anchored on lower deck 24 and an opposite end 52 attached to a spring anchor 53 secured on shaft 41. When cable 36 is released spring 50 partially unwinds, rotating pulley wheel 40 counterclockwise and cam pin 42 upwardly in slot 44, rapidly moving the upper deck 21 rearwardly on lower deck 24, whereupon cam pin 43 is engaged in cam slot 45 continuing rapid rearward movement of the upper deck. During rearward movement upper deck 21 is accelerated at about one gravity. Actuation of cable 36 is controlled in a suitable manner responsive to a pinsetter operating mechanism as is fully discussed in the previously mentioned Huck patent.

Mechanism is provided for lifting and resetting standing pins on the alley for removal of dead wood after the first ball of each frame. In the illustrated embodiment upper deck 21 is provided on its underside with circular resilient pads or disks 55 (Figure 5) suitably secured to the underside of upper deck plate 23 and positioned to engage pins standing on the alley when the deck assembly is lowered and in pin detecting position, whether the pins are standing exactly on spot or within a predetermined area surrounding the spot. Each pad 55 is preferably of a resilient material such as sponge rubber and has an upwardly extending ring 56 secured to a metal ring 57 which is mounted on upper deck plate 23 by upwardly extending bolts 58. Ring 56 may be secured to metal ring 57 in any suitable manner such as by an adhesive. Rings 56 and 57 define an upwardly opening recess 59 of resilient pad 55.

Engagement of pads 55 with the tops of standing pins holds the pins securely in position on the alley to be gripped at the neck thereof by scissor pick-up mechanism 61 mounted on a plate 60 secured in spaced relation beneath lower deck frame 25 and provided with openings 60a aligned with corresponding openings in lower deck member 25 and with pads 55 when the upper and lower decks are relatively positioned as illustrated. One scissor mechanism is associated with each opening 60a and each includes a pair of scissor arms 62 pivotally mounted on lower deck plate 60 for securely gripping a pin standing within opening 60a in lower deck plate 60. Suitable scissor pick-up mechanism is more fully discussed in both the aforementioned Huck patent and in Sanford Patent No. 2,817,528.

Means for detecting and indicating pins standing on the alley is provided by apparatus including switch assemblies 65 mounted on upper deck plate 23, and one associated with each opening 30 therein. Each switch assembly 65 is operated in response to a switch actuator detecting the presence of a standing pin on the bowling alley surface to operate a suitable indicator visible to the players, such as a light illuminated in response to operation of the respective switch assembly 65, as is more fully described in copending patent application of Conklin & Torresen for a "Pin Detecting and Indicating Apparatus" Ser. No. 126,974, filed July 26, 1961, assigned to the assignee of this application.

Figure 6:
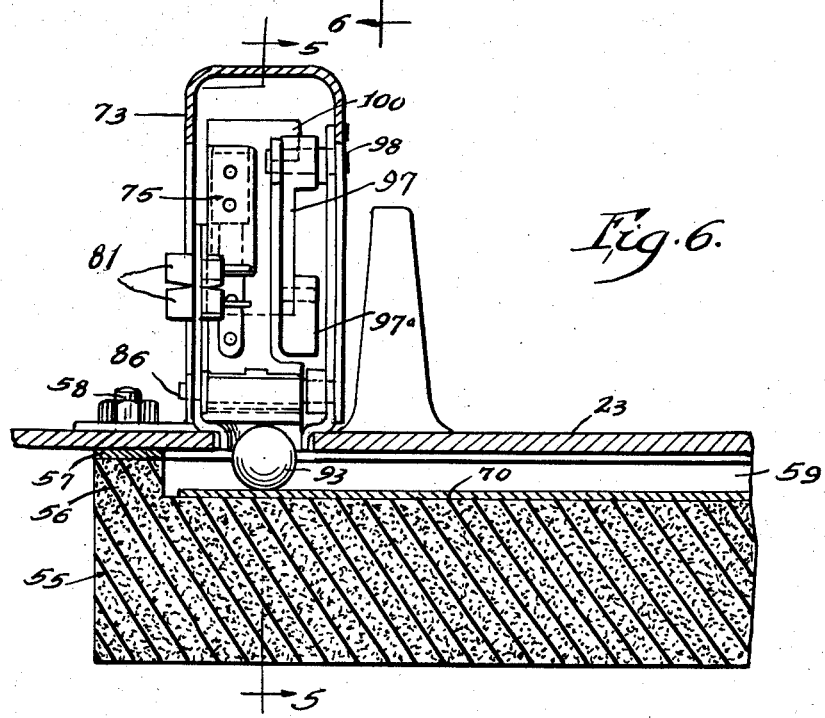
FIGURE 6 is a fragmentary vertical section of the switch assembly taken generally along the line 6—6 of FIGURE 5.

Referring to FIGURES 5 and 6, in the illustrated embodiments the switch actuators are in the form of the resilient pad assemblies 55 each receiving a rigid plate 70 in recess 59. When the resilient pad assembly engages the head of a standing pin it moves plate 70 upwardly to operate the related switch assembly 65 from a normal position in which the indicator light is out to a set position in which the indicator light is illuminated.

Each switch assembly 65 is mounted on the top of upper deck plate 23 in any suitable manner and includes a cover 73 secured to deck plate 23. A switch 75, in the illustrated embodiment a contact assembly, is mounted on a support 76 for operation between normal and set portions. Support 76 is suitably attached to plate 23 and mounts a fixed contact arm 77 and insulated therefrom a leaf spring contact arm 78, both arms having cooperating contacts 79. Spring arm 78 includes a switch actuator 80 secured to and extending outwardly from the lower end of this arm. In the present embodiment the switch is open in normal position and is resiliently urged to normal position. Each switch is connected through sockets 81 with an indicator light for turning on the light when the switch is closed in set position.

Operating means responsive to the resilient pad 55 engaging a pin standing on the alley is provided for operating switch 75 from normal to set position, and for releasably retaining switch 75 in its set position. In the present embodiment these means include a generally L-shaped lever 85 mounted by pin 86 on support 76 for free pivotal movement about a generally horizontal axis. As illustrated in FIGURE 5, lever 85 is pivotal between a normal position illustrated by the solid lines, and a set position illustrated by the dotted lines, these lever positions corresponding to similar switch positions. An operating arm 87 engages switch actuator 80 to retain switch 75 in normal position when the lever is in its normal position. The lever is normally maintained in its normal position, and in the present embodiment a weight 88 is attached to an actuating arm 89 of the lever for rotating the lever clockwise, as viewed in FIGURE 5, to normal position.

When resilient pad assembly 55 engages the head of a pin standing on the bowling alley, the plate 70 is urged upwardly to move an actuator in the form of a nylon ball 93 upwardly through opening 94 in upper deck plate 23 for pivoting lever 85 counterclockwise from its normal to set position.

In order to releasably retain lever 85 in its set position when pad 55 is released from the pin head, an inertia latch member 97 weighted at 97a is mounted by pin 98 on support 76 for free pivotal movement about a substantially horizontal axis. As illustrated in FIGURE 5, inertia latch member 97 pivots from a normal unbalanced position illustrated by solid lines, to a balanced set position illustrated in part by dotted lines.

Cooperating latch portions on lever 85 and inertia latch member 97 are provided for retaining the inertia latch member in unbalanced position when lever 85 is in its normal position, so that the inertia latch member swings to its set position as lever 85 is pivoted by ball 93 to its set position. These latch means further releasably hold lever 85 for release from set position in response to stopping movement of upper deck 21 longitudinally of the alley in one direction from pin detecting to pin setting position, that is rearwardly across lower deck 24 in response to spiral compression spring 50 unwinding on release of cable 36.

These cooperating latch portions include a generally vertical surface of a finger 100 extending outwardly from the top portion of lever arm 87 and a generally vertical arcuate abutment 101 at the top of inertia latch member 97 for releasably retaining lever 85 in its set position. The cooperating latch portions further include a lower edge of lever finger 100 and a top generally horizontal surface 102 on the top of inertia latch member 97, surface 102 intersecting surface 101 of the inertia latch member, for retaining the inertia latch member in unbalanced position when the lever is in its normal position, as illustrated by the solid lines in FIGURE 5.

To briefly summarize the operation of this embodiment, when the deck assembly is in pin detecting position with upper deck 21 held forwardly disposed with respect to lower deck 24 by cable 36, and as the deck assembly moves downwardly toward the bowling alley, as a resilient pad assembly 55 engages the head of a pin standing on the alley rigid plate 70 is moved upwardly. Upper movement of plate 70 moves ball 93 upwardly to pivot lever 85 counterclockwise from its normal position shown in solid lines in FIGURE 5 to its set position shown by dotted lines. Movement of lever 85 to its set position permits the switch 75 to move to its set position, in the present embodiment closing contact 79 to illuminate the associated indicator light. When the deck assembly moves upwardly and resilient pad assembly 55 moves away from the bowling pin, lever 85 is retained in its set position by inertia latch member 97. As the deck assembly prepares to lower a new unit of ten pins on the bowling alley, the upper deck 21 is moved at high acceleration rearwardly across lower deck assembly 24 longitudinally of the bowling alley by spiral torsion spring 50, to the right as viewed in FIGURE 5, and an inertia reaction of inertia latch member 97 causes this member to pivot counterclockwise as the deck stops, whereupon weight 88 pivots lever 85 clockwise so that the lower edge of lever finger 100 seats against top surface 102 of inertia latch member 97 to retain the inertia latch member positioned for subsequent operation of the switch assembly.

Referring now to the embodiment of FIGURES 7 and 8, similar reference numerals primed indicate similar or identical parts as in the prior embodiment. In this embodiment, switch 75 is replaced by a microswitch 75' having an actuator 80' normally urged outwardly of the switch body when the switch is in normal position. Also, previously described weight 88 is replaced by a spiral tension spring 88' having opposite ends secured to support 76' and the upper end of upright lever arm 87' for normally urging lever 85' to its normal position as illustrated by the solid lines in FIGURE 7. As previously described, when resilient pad assembly 55' engages the head of a standing pin on the bowling alley, the ball 93' pivots lever 85' counterclockwise from its normal position to its set position releasing switch actuator 80' for operation of the switch from normal to set position thereby actuating a related indicator. This embodiment also differs from the foregoing embodiment in that the cooperating latch means herein includes an upturned finger 100' on lever arm 87' which abuts an outer generally horizontal surface 101' on an inertia member 97' (weighted at 97a') when the lever is in set position, for releasably holding the lever in set position and positioning the inertia latch member for releasing the lever in response to acceleration of the upper deck 21 from pin detecting to pin setting position as previously described. The cooperating latch portions further include an inner generally horizontal abutting surface 102' on inertia latch member 97' which is also engaged by lever finger 100' in normal position for retaining the inertia latch member in unbalanced position ready for another cycle of the switch assembly. Normal and set positions of latch member 97' are substantially the same. A shoulder on latch member 97' between surfaces 101' and 102' prevents return of lever 89' to normal position. Movement of deck 23' to the right resets latch member 97', and this latch member has no balanced position.

Figure 9:
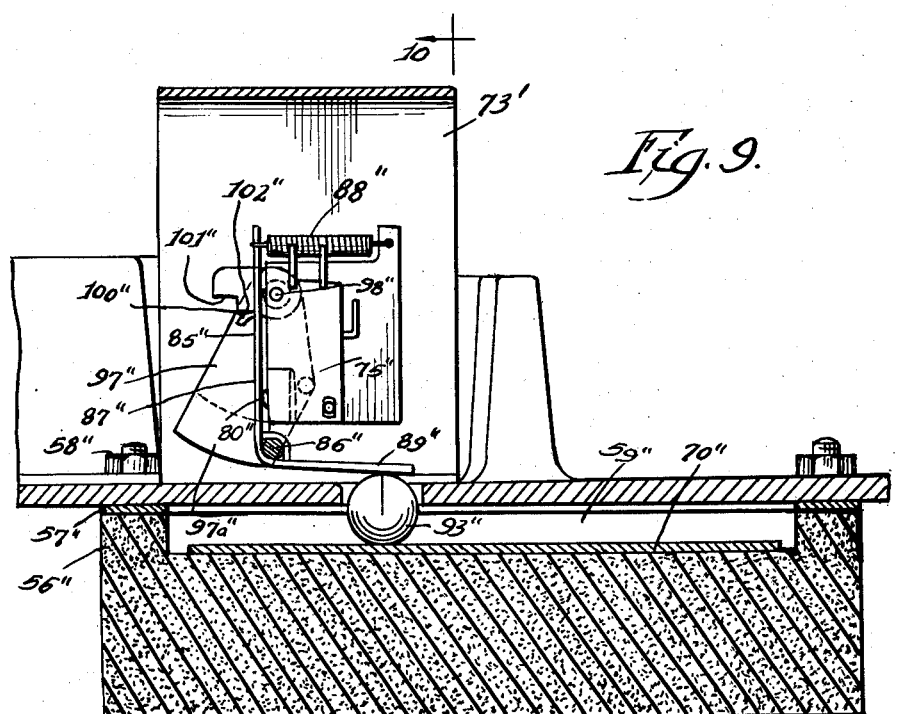
FIGURE 9 is a fragmentary vertical section, similar to FIGURE 5, of still another embodiment of a switch assembly; and, FIGURE 10 is a fragmentary vertical section taken generally along the line 10—10 of FIGURE 9.
Figure 10:
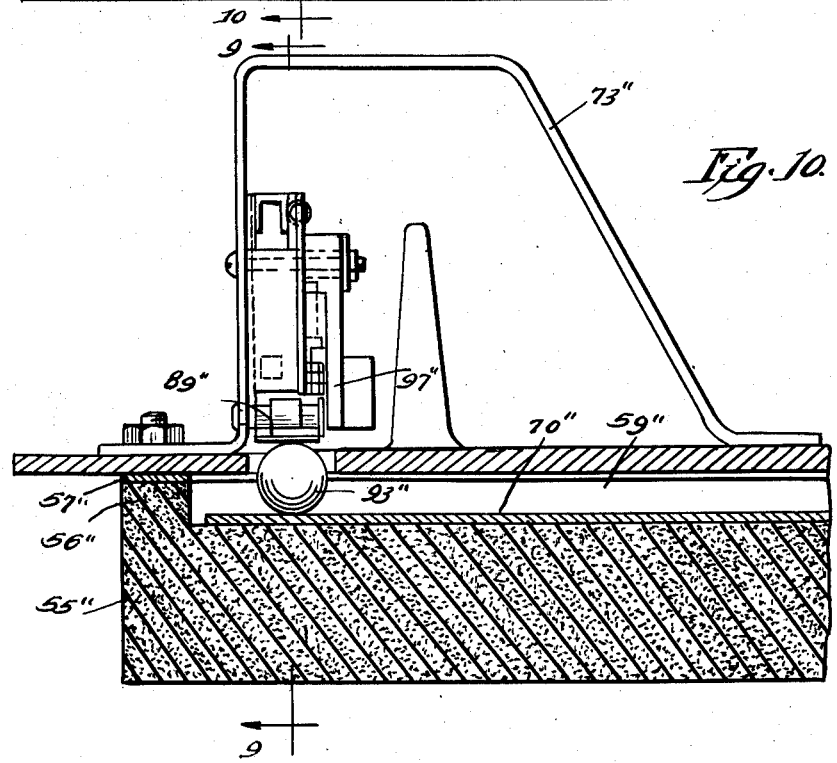

Referring now to the embodiment of FIGURES 9 and 10, similar reference numerals double primed indicate parts similar or identical to those of the immediately preceding embodiment of FIGURES 7 and 8. In this embodiment inertia latch member 97" weighted at 97a" depends from its pivot pin 98". The cooperating latch portions of lever 85" and the inertia latch member 97" include a downturned finger 100" on lever arm 87" which engages an outer generally horizontal abutment surface 101" when lever 85" is in its set position, for releasably holding the lever in set position and positioning the inertia latch member, balanced, for releasing the lever in response to acceleration of the upper deck 23 longitudinally of the alley from pin detecting to pin setting position, as previously described. Finger 100" also engages an inner generally horizontal abutting surface 102" on inertia latch member 97" for retaining the inertia latch member in unbalanced position when the lever is in normal position so that the inertia latch member may swing to set position upon a new cycle of the switch assembly.

Thus, a pin detecting apparatus which is easily maintained and effective and reliable in operation while being relatively inexpensive and simple in construction, is provided. The switches remain in set position until the upper deck moves to pin setting position, and holding circuits are eliminated from the electrical circuit between the switches and indicators, further simplifying the system. Also, each switch assembly is operative independently of the other switch assemblies to further simplify installation and maintenance of the pin detecting apparatus.

We claim:

1. In a bowling pin detecting and indicating apparatus for operating an indicator upon detection of a pin standing on a bowling alley, and installed on a deck mounted for movement longitudinally of the bowling alley and toward and away from the alley, the combination comprising: means on said deck for detecting a pin standing on the alley as the deck moves toward the alley; a switch assembly having a base mounted on said deck, a switch mounted on said base and operable between normal and set positions for controlling the indicator; means normally maintaining said switch in normal position for rendering said indicator inoperative, a lever freely pivotally mounted on said base for movement between normal and set positions corresponding to similar switch positions for operating said switch from normal to set position for rendering said indicator operative and releasably retaining said switch in its set position upon movement of the lever from normal to set position, means normally maintaining said lever in its normal position, and an inertia latch member freely pivotally mounted on said base; means responsive to the first said means detecting a standing pin for operating said lever from normal to set position; and cooperating latch means on said lever and inertia latch member for releasably holding said lever in set position and positioning said inertia latch member for releasing said lever in response to acceleration of said deck at the beginning of movement thereof longitudinally of said alley.

2. In a bowling pin detecting apparatus including a part mounted for movement longitudinally of a bowling alley, the combination comprising: means on said part for detecting a pin standing on the alley; a switch operable between normal and set positions; an actuator movable between normal and set positions for operating said switch correspondingly; means responsive to the first said means detecting a standing pin for operating said switch actuator from normal to set position; an inertia member separate from said switch actuator movably mounted on said part for releasably latching said switch actuator in set position; and means releasably positioning said inertia member when said switch actuator is in set position for releasing said switch actuator for movement to normal position in response to acceleration of said part longitudinally of said alley.

3. In a bowling pin detecting apparatus including a deck mounted for movement longitudinally of a bowling alley and toward and away from the alley, the combination comprising: means on said deck for detecting a pin standing on the alley as the deck moves toward the alley; a switch on said deck and operable between normal and set positions; means normally maintaining said switch in normal position; an inertia latch member movably mounted on said deck for releasably latching said switch in set position; means responsive to the first said means detecting a standing pin for operating said switch from normal to set position; and latch means on said responsive means for retaining said inertia latch member in position when said switch is in set position and releasably holding said inertia latch member positioned for releasing said switch for movement to normal position in response to operation of said deck longitudinally of said alley.

4. The apparatus of claim 3 wherein said inertia latch member is balanced in set position.

5. The apparatus of claim 3 wherein said inertia latch member is unbalanced in set position.

6. The apparatus of claim 3 wherein said latch means releases said inertia latch member in response to acceleration of said deck at the beginning of movement thereof in one direction longitudinally of the alley.

7. In a bowling pin detecting and indicating apparatus for operating an indicator upon detection of a pin standing on a bowling alley, and installed on a deck mounted for movement toward and away from the bowling alley and longitudinally of the alley, the combination comprising: a resilient pad on said deck for engaging the head of a pin standing on the alley when the deck is lowered; a switch assembly having a base mounted on said deck, a switch mounted on said base and operable between normal and set positions for controlling the indicator, means normally maintaining said switch in normal position for rendering said indicator inoperative, a lever freely pivotally mounted on said base about a generally horizontal axis for movement between normal and set positions corresponding to similar switch positions and for operating said switch from normal to set position for rendering said indicator operative and releasably retaining said switch in its set position upon movement of the lever from normal to set position, means normally maintaining said lever in its normal position, an inertia latch member freely pivotally mounted on said base about a horizontal axis for movement between unbalanced positions, means responsive to said resilient pad engaging a standing pin for operating said lever from normal to set position, and cooperating latch means on said lever and inertia latch member for retaining said inertia latch member in unbalanced position when said lever is in normal position, and when said lever is in set position releasably holding said lever and positioning said inertia latch member for releasing said lever in response to acceleration of said deck at the beginning of movement thereof longitudinally of said alley in one direction.

8. In the apparatus of claim 7 wherein the means normally maintaining said lever in its normal position comprises a spring.

9. In a pinsetter apparatus including a deck member movable toward and away from a bowling alley and movable also at changing velocity longitudinally of the alley; pin detecting means on the deck member respectively at positions corresponding to pin positions on the alley and engageable with the heads of standing pins on the alley for operation thereby when the deck member is moved toward the alley; switches corresponding respectively to the pin detecting means and operable between normal and set positions; means responsive to the first said means detecting standing pins for operating said switches respectively from normal to set positions; an inertia member for each switch movably mounted on said deck member independently of the switch for releasably latching said switch in set position; and means releasably positioning each inertia latch member when its switch is in set position for releasing said switch for movement to normal position in response to change in velocity of movement of said deck member longitudinally of said alley.

10. In a bowling pin detecting apparatus installed on a deck movable toward and away from a bowling alley and having a deck member mounted for movement parallel to the alley, the combination comprising: means on said deck member for engaging the head of a pin standing on the alley, a switch on said deck member operable between normal and set positions, an actuator on said deck member movable between normal and set positions for operating said switch correspondingly, means responsive to the first said means engaging a standing pin for operating said switch actuator from normal to set position, latch means additional to said actuator for releasably holding said switch actuator in set position, and means responsive to movement of the deck member parallel to the alley for operating said latch means to release said switch actuator for movement from set to normal position.

11. In a pinsetter apparatus including a pin-setting deck structure movable toward and away from a bowling alley and including a deck member movable longitudinally of the alley, pin detecting means on the deck member respectively at positions corresponding to pin positions on the alley and engageable with the heads of standing pins on the alley for operation thereby when the deck member is moved toward the alley, switches mounted on the deck member for operation respectively by operation of the detecting means from normal to second positions corresponding to standing pins, and latch means mounted independently of the switches operated respectively upon operation of the switches to second positions and releasably holding the switches for movement from second to normal positions upon operation of the deck member longitudinally of the alley in one direction.

12. In a bowling pin detecting apparatus including a deck structure movable toward and away from a bowling alley and having a deck member mounted for movement longitudinally of the alley, in combination, means movable on said deck member for engaging the head of a pin standing on the alley when said deck structure is moved toward the alley, a switch on said deck member operable between normal and set positions, an actuator on said deck member movable between normal and set positions for operating said switch correspondingly, said actuator being movable from normal to set position in response to movement of said engaging means upon contact of the latter with a pin, a latch member mounted on said deck member for movement, upon movement of said actuator to set position, from a normal position to a set position releasably latching said actuator in set position, means responsive to movement of the deck member longitudinally of the alley for moving said latch member to normal position thereby to release said actuator, and means for thereupon moving said actuator to normal position.

13. In a bowling pin detecting apparatus including a deck structure movable toward and away from a bowling alley and having a deck member mounted for movement longitudinally of the alley at varying velocity, in combination, means movable on said deck member for engaging the head of a pin standing on the alley when said deck structure is moved toward the alley, a switch on said deck member operable between normal and set positions, an actuator on said deck member movable between normal and set positions for operating said switch correspondingly, said actuator being movable from normal to set position in response to movement of said engaging means upon contact of the latter with a pin, a weighted inertia latch member movably mounted on said deck member for movement, in response to movement of said actuator to set position, from a normal position to a set position releasably latching said actuator in set position, said latch member being movable from set position to normal position in response to variation in the velocity of movement of the deck member longitudinally of the alley thereby to release said actuator, and means for thereupon moving said actuator to normal position.

14. A combination as defined in claim 13 including cooperating latch means on said actuator and latch member for holding said latch member in normal position when said actuator is in normal position.

15. A combination as defined in claim 14 wherein said latch member is unbalanced in normal position.

16. A combination as defined in claim 13 including cooperating latch means on said latch member and actuator for holding said latch member in set position.

17. A combination as defined in claim 16 wherein said latch member is unbalanced in set position.

18. A combination as defined in claim 13 wherein said latch member is balanced in set position.

19. A combination as defined in claim 13 wherein said latch member moves from set position to normal position responsive to acceleration of said deck member longitudinally of the alley.

20. A combination as defined in claim 13 wherein said latch member moves from set position to normal position responsive to deceleration of said deck member longitudinally of the alley.

21. A combination as defined in claim 12 wherein the last recited means comprises a weight biasing the actuator toward normal position at all times.

22. A combination as defined in claim 13 wherein the last recited means comprises a spring constantly urging the actuator toward normal position.

23. In a bowling pin detecting apparatus including a deck structure movable toward and away from a bowling alley and having a deck member mounted for movement longitudinally of the alley at varying velocity, in combination, means movable on said deck member for engaging the head of a pin standing on the alley when said deck structure is moved toward the alley, a switch on said deck member operable between normal and set positions, an actuator lever on said deck member movable between normal and set positions for operating said switch correspondingly, means constantly urging said lever toward normal position, said lever being movable from normal position to set position in response to movement of said engaging means upon contact of the latter with a pin, a weighted inertia latch member pivoted on said deck member for movement between a normal unbalanced position and a set position, cooperating latch means on said latch member and lever for holding said latch member in normal position, said latch member being movable to set position in response to movement of said lever to set position, cooperating means on the lever and latch member for holding the lever in set position when the latch member is in set position, and said latch member being movable from set position to normal position in response to variation in the velocity of movement of the deck member longitudinally of the alley thereby to release said lever.

References Cited in the file of this patent

UNITED STATES PATENTS

| | | |
|---|---|---|
| 2,817,528 | Sanford | Dec. 24, 1957 |
| 2,890,886 | Dumas | June 16, 1959 |
| 2,977,121 | Flint et al. | Mar. 28, 1961 |